(12) United States Patent
Solomon et al.

(10) Patent No.: US 6,376,600 B1
(45) Date of Patent: *Apr. 23, 2002

(54) AQUEOUS COMPOSITION

(75) Inventors: Robert David Solomon, Souderton; Bradley Keith Hageman, Pottstown; Leo Joseph Procopio; Margo Raate Schaefer, both of Lansdale; Gary David Greenblatt, Rydal; Stephen Scott Edwards, Horsham; Gary Robert Larson, Hatfield; Alvin Michael Maurice, Lansdale; Stewart Orlyn Williams, Hatfield; Patricia Marie Lesko, Ottsville; Peter Reeves Sperry, Doylestown, all of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/719,462

(22) PCT Filed: Jul. 20, 1999

(86) PCT No.: PCT/US99/16514

§ 371 Date: Dec. 11, 2000

§ 102(e) Date: Dec. 11, 2000

(87) PCT Pub. No.: WO00/05272

PCT Pub. Date: Feb. 3, 2000

Related U.S. Application Data

(63) Continuation-in-part of application No. 09/357,176, filed on Jul. 16, 1999, now Pat. No. 6,248,826.

(60) Provisional application No. 60/093,995, filed on Jul. 24, 1998.

(51) Int. Cl.$^7$ .............................. C08J 3/02; C08K 3/00; C08K 3/20; C08L 5/00; C08L 31/00

(52) U.S. Cl. ........................ 524/543; 524/401; 524/500; 524/501; 524/502; 524/504; 524/533; 524/556; 524/559; 524/804; 524/823; 524/832; 524/833; 524/849; 526/72; 526/75; 526/318.4; 526/318.43; 526/321

(58) Field of Search .................................. 524/401, 500, 524/501, 502, 504, 533, 543, 556, 559, 804, 823, 832, 833, 849; 526/72, 75, 318.4, 318.43, 321

(56) References Cited

U.S. PATENT DOCUMENTS 5,587,431 A * 12/1996 Gridnev et al. .............. 525/269
5,710,227 A * 1/1998 Freeman et al. ............ 526/208
6,248,826 B1 * 6/2001 Solomon et al. ............ 524/556

* cited by examiner

*Primary Examiner*—Patrick D. Niland
(74) *Attorney, Agent, or Firm*—Gary D. Greenblatt

(57) ABSTRACT

Aqueous dispersion of copolymers formed by the polymerization of a monomer mixture containing 0.05% to less than 4.5% by weight of certain terminally unsaturated oligomers are useful for improving the scrub resistance, corrosion resistance, opacifying capacity and/or efflorescence resistance of a coating.

15 Claims, No Drawings

AQUEOUS COMPOSITION

This application is a 371 application of PCT/US99/16514, filed on Jul. 20, 1999, which is a continuation-in-part of U.S. Ser. No. 09/357,176 filed Jul. 16,1999 now U.S. Pat. No. 6,248,826, which claims priority to U.S. provisional application Ser. No. 60/093,995 filed Jul. 24, 1998.

This invention is concerned with an aqueous composition. More particularly, the present invention concerns an aqueous composition comprising, dispersed or dissolved therein, a copolymer of a terminally unsaturated oligomer.

Aqueous based coatings, such as for example latex or emulsion polymer containing paints, constitute a significant segment of all coatings in use today. Aqueous based coatings offer the advantages of being generally easier to use than conventional oil based coatings, such as for example alkyd paints, and contain fewer or no undesirable volatile organic solvents.

Formulators of aqueous based coatings desire to match or improve upon the performance properties of alkyd based paints, including for example scrub resistance, corrosion resistance, efflorescence resistance, block resistance, dirt pick-up resistance, tack resistance. mar resistance, print resistance. stress resistance and opacifying capability, Though it may be highly desirable for a paint to demonstrate maximum performance for all relevant properties, in reality such paints cannot be achieved, for example a paint with maximum dirt pick-up resistance may not be able to demonstrate maximum stress resistance as well. Instead, formulators tend to provide no optimized paints, which are paints having a compromise of several desirable properties, for example a paint with good dirt pick-up resistance may be able to demonstrate average stress resistance.

A formulator can alter the properties of a particular coating by adjusting it's composition, such as by changing the particular amounts of the components and/or by changing the composition of those components.

Aqueous dispersions or solutions of carboxylic acid containing polymers are known to have many applications, including use as binders in coating compositions. Typically, these polymers are formed from the polymerization of a mixture of ethylenically unsaturated monomers comprising up to 20%, typically 0.05% to 10%, by weight of a carboxylic acid containing monomer, such as acrylic acid (AA) or methacrylic acid (MAA). The properties of a coating comprising such polymers can be altered by either changing the mixture of monomers to be polymerized to form a particular polymer, and/or by using two or more different polymers and/or by using multi-staged (e.g. core/shell) polymers, as disclosed for example in U.S. Pat. No. 4,193, 902, EP-A-0466409, EP-A-0612805, EP-A-0694564 and EP-A-0741173.

WO-A-9532228 and WO-A-9532255 each disclose aqueous coatings including a binder based on a graft copolymer comprising 2 to 98%, preferably 60 to 95%, most preferably 60 to 85%, by weight of a polymeric backbone of polymerized ethylenically unsaturated monomers and 98 to 2%, preferably 40 to 5%, most preferably 40 to 15%, by weight of macromonomers attached to said polymeric backbone at a single terminal point of said macromonomer, said macromonomer having a number average molecular is weight of 500 to 30,000 and comprising 5 to 100%, preferably at least 10% and more preferable 20 to 40%, by weight of macromonomers, of polymerized alpha-beta ethylenically unsaturated monomers having carboxylic-acid functionalities or instead amine functionalities, and wherein at least a portion of the carboxylic-acid or amine groups have been neutralized and wherein the macromonomers are soluble or dispersed in aqueous carrier to stabilize the portion of the graft polymer which forms an insoluble particle. The graft copolymer is disclosed to have a weight average molecular weight up to 500,000, with a most preferred weight average molecular weight substantially less than 500,000 e.g. up to 300,000. The graft copolymers are described to be useful as film forming vehicles in the preparation of waterborne coating compositions such as, for example, basecoat or clearcoat compositions useful in automotive applications.

There is a continuing desire by formulators to provide aqueous coatings which demonstrate improved performance, such as scrub resistance, corrosion resistance, and/or efflorescence resistance, over other aqueous coatings. It is an object of this invention, therefore, to provide aqueous compositions which are particularly, though not exclusively, useful as performance enhancing binders for aqueous coatings. In particular, though not exclusively, it is the object of this invention to provide aqueous coatings for improving at least one of the following properties of an aqueous coating: scrub resistance, corrosion resistance, efflorescence resistance and opacifying capacity.

In accordance with the present invention, there is provided an aqueous composition comprising, dispersed or dissolved therein, a copolymer formed by polymerisation, preferably by emulsion polymerisation, of a monomer mixture consisting of:

a) 0.05 to less than 4.5% by weight of one or more terminally unsaturated oligomers of the formula:

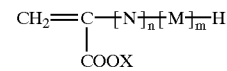

wherein N is the residue of an ethylenically unsaturated monomer of the formula:

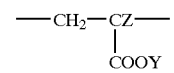

wherein M is the residue of an ethylenically unsaturated monomer other than N;

wherein said N and M residues are randomly arranged in said oligomer;

wherein m is the total number of M residues in said oligomer and is in the range 0 to 75;

wherein n is the total number of N residues in said oligomer and is in the range 3 to 150;

wherein n is equal to or greater than m and the sum of n and m is in the range from 3 to 150;

wherein X and each Y is independently selected from the group consisting of H, $NH_4$, alkali metals and alkaline earth metals; and wherein each Z is independently selected from the group consisting of H and $CH_3$;

b) greater than 85.5 to 99.95% by weight of at least one monomer selected from the group consisting of esters of acrylic and methacrylic acid with alcohols containing from 1 to 24 carbons, amides of acrylic and methacrylic acid, vinyl esters of carboxylic acids containing from 1 to 20 carbons, vinyl-aromatic compounds containing compounds containing up to 20 carbons, ethylenically unsaturated nitriles containing from 3 to 6 carbons, vinyl halides, and non-aromatic hydrocarbons containing from 2 to 8 carbons and at least one olefinic double bond; and c) 0 or up to 10% by weight of one or more other copolymerisable monomers.

In accordance with another aspect of the present invention, there is provided a method of improving the performance of a coating, wherein the method comprises I) applying to a substrate an aqueous coating composition comprising, dispersed or dissolved therein. a copolymer formed by polymerization, preferably emulsion polymerization, of a monomer mixture consisting of:

a) 0.05 to less than 4.5% by weight of one or more terminally unsaturated oligomers of the formula:

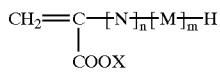

wherein N is the residue of an ethylenically unsaturated monomer of the formula:

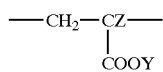

wherein M is the residue of an ethylenically unsaturated monomer other than N;
wherein said N and M residues are randomly arranged in said oligomer;
wherein m is the total number of M residues in said oligomer and is in the range 0 to 75;
wherein n is the total number of N residues in said oligomer and is in the range 3 to 150;
wherein n is equal to or greater than in and the sum of n and in is in the range from 3 to 150;
wherein X and each Y is independently selected from the group consisting of H, $NH_4$, alkali metals and alkaline earth metals; and
wherein each Z is independently selected from the group consisting of H and $CH_3$;

b) greater than 85.5 to 99.95% by weight of at least one monomer selected from the group consisting of esters of acrylic and methacrylic acid with alcohols containing from 1 to 24 carbons, amides of acrylic and methacrylic acid, vinyl esters of carboxylic acids containing from 1 to 20 carbons, vinyl-aromatic compounds containing compounds containing up to 20 carbons, ethylenically unsaturated nitriles containing from 3 to 6 carbons, vinyl halides and non-aromatic hydrocarbons containing from 2 to 8 carbons and at least one olefinic double bond; and c) 0 or up to 10% by weight of one or more other copolymerisable monomers; and II) drying the aqueous coating composition to form said coating.

Surprisingly, coatings formed from aqueous coating compositions comprising the aqueous composition defined above can demonstrate superior performance not only over coatings formed from conventional aqueous coating compositions based on copolymers which do not comprise an oligomeric component but also over those formed from aqueous coating compositions based on copolymers comprising higher quantities of oligomeric component (macromonomer).

The term "said N and M residues are arranged randomly in said oligomer" as used in the definition of the terminally unsaturated oligomers a) means that the residue adjacent the terminally unsaturated moiety may be either an N or an M residue, that the residue adjacent to the residue adjacent the terminally unsaturated moiety may be either an N or an M residue, and so on.

Terminally unsaturated oligomers a) are known in the art. Processes suitable for the manufacture of oligomers a) are described, for example, in U.S. Pat. No. 4,056,559, U.S. Pat. No. 5,710,227, U.S. Pat. No. 5,587,431, U.S. Pat. No. 4,680,352, U.S. Pat. No. 4,694,054, and EP-0779305.

In the terminally unsaturated oligomers a) X is preferably H.

In the terminally unsaturated oligomers a) Y is preferably H.

In the terminally unsaturated oligomers a) Z is preferably H.

In the terminally unsaturated oligomers a) M is preferably a residue of the formula

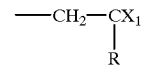

where $X_1$ is —H or —$CH_3$,
R is a phenyl radical, a vinyl radical, —$CONH_2$, —CN or —$COOX_2$,
$X_2$ is H, a ($C_1$ to $C_8$) alkyl radical, a vinyl radical, or an allyl radical. More preferably, M is a residue of one or more ethylenically unsaturated monomers selected from the group consisting of methylacrylate, ethyl acrylate, butyl acrylate, ethylhexyl acrylate, styrene, isoprene, butadiene, vinyl acetate, acrylamide, acrylonitrile, allylmethacrylate, methyl methacrylate, ethyl methacrylate and butyl methacrylate.

In the terminally unsaturated oligomers a). the ratio of n:m is preferably in the range of 1:0 to 3:1. more preferably 1:0 to 9:1. Most preferably, the ratio of n:m is 1:0.

In the terminally unsaturated oligomers a) m is preferably in the range 0 to 9 and n is preferably in the range 3 to 50. More preferably, m is 0 and n is in the range 3 to 25.

Suitable monomers b) are ($C_1$ to $C_{24}$) alkyl (meth) acrylates, preferably ($C_1$–$C_8$) alkyl (meth)acrylates, most preferably methyl methacrylate, ethyl methacrylate, ethyl acrylate, butyl acrylate, butyl methacrylate and 2-ethylhexyl acrylate. The amides of acrylic and methacrylic acid is preferably acrylamide. The vinyl esters of carboxylic acids with from 1 to 20 carbons are preferably vinyl laurate, vinyl stearate, vinyl propionate and vinyl acetate, most preferably vinyl acetate. The vinyl aromatic compounds containing up to 20 carbons are preferably vinyltoluene, styrene, methylstyrene, butylstyrene and decylstyrene, most preferably styrene. The ethylenically unsaturated nitrites containing from 3 to 6 carbons are preferably acrylonitrile and methacrylonitrile. The vinyl halides are preferably vinyl chloride and vinylidene chloride. The non-aromatic hydrocarbons with 2 to 8 carbons and at least one olefinic double bond are preferably butadiene, isoprene and chloroprene.

Monomers b) are preferably selected from the group consisting of methyl(meth)acrylate, ethyl(meth)acrylate, butyl(meth)acrylate, 2-ethylhexyl(meth)acrylate, decyl (meth)acrylate, lauryl(meth)acrylate, isobornyl(meth) acrylate, isodecyl(meth)acrylate, oleyl(meth)acrylate, palmityl(meth)acrylate, steryl(meth)acrylate, styrene, butadiene, vinyl acetate. vinyl chloride, vinylidene chloride, acrylonitrile, methacrylonitrile, acrylamide and glycidyl-methacrylate.

The monomer mixture which is polymerized to form the copolymer optionally comprises up to 10% by weight of other copolymerisable monomers c). Suitable other copolymerisable monomers are preferably selected from the group consisting of hydroxyethyl(meth)acrylate, hydroxypropyl (meth)acrylate, acrylic acid, methacrylic acid, crotonic acid, fumaric acid, maleic acid, mono-methyl itaconate, monomethyl fumarate, monobutyl fumarate, maleic anhydride, phospho-ethyl methacrylate, glycidyl (meth)acrylates, substituted acrylamides, diacetone acrylamide, glycidyl (meth) acrylates, glycidyl methacrylate, acetoacetoxy ethyl methacrylate, acrolein, methacrolein, dicyclopentadienyl methacrylate, dimethyl meta-isopropenyl benzyl isocyanate, isocyanato ethyl methacrylate, methyl cellulose, hydroxyethyl cellulose, ethylene, propylene, N-vinyl pyrrolidone, N,N'-dimethylamino(meth)acrylate, and polymerizable surfactants, including for example but not limited to Trem LF-40 available from Henkel Corp.

Preferably the copolymers have a weight average molecular weight above 500,000, more preferably above 750,000, and most preferably above 1,000,000, as measured by gel permeation chromatography.

Preferably the copolymers have a glass transition temperature (Tg) in the range of from −10 to 120 ° C., preferably −5 to 40 ° C., as measured by Differential Scanning Calorimetry.

The monomer mixture which is polymerized to form the copolymer preferably comprises from 0.1 to less than 4.5%, more preferably from 1.0 to less than 4.5% by weight said terminally unsaturated oligomers a). Said monomer mixture preferably comprises 4% or less, more preferably 3% or less, and yet more preferably 2% or less, by weight of terminally unsaturated oligomer a).

The monomer mixture which is polymerized to form the copolymer preferably comprises more than 95.5%, more preferably 96% or more, more preferably 97% or more, and yet more preferably 98% or more, by weight of monomer b).

The above copolymer is preferably a latex wherein the particles of the dispersion preferably have an average diameter no greater than 250 nm, more preferably no greater than 150 nm, and most preferably no greater than 125 nm. In one embodiment of the present invention, the particles of the dispersion have an average diameter no greater than 100 nm.

The above copolymer dispersion may be formed by any emulsion polymerisation technique suitable for emulsion polymerisation of monomer mixtures comprising less than 4.5% by weight mono- or di- carboxylic acid monomer. Such techniques are well known in the art. For example, the emulsion polymerisation process described in U.S. Pat. No. 5,356,968 is very suitable for the preparation of the polymer dispersions of the present invention.

The copolymer dispersions according to the present invention can be used in the preparation of aqueous dispersions having a multimodal, e.g. bimodal, particle size distribution. Accordingly, in a further aspect of the present invention, there is provided an aqueous composition comprising a dispersion of polymer particles having a multimodal particle size distribution, wherein at least one mode of said multimodal particle size distribution is attributable to a dispersion of polymer particles comprising a copolymer formed by the emulsion polymerisation of a monomer mixture comprising:

a) 0.05 to less than 4.5% by weight of one or more terminally unsaturated oligomers of the formula:

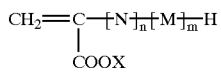

wherein N is the residue of an ethylenically unsaturated monomer of the formula:

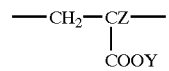

wherein M is the residue of an ethylenically unsaturated monomer other than N;

wherein said N and M residues are randomly arranged in said oligomer;

wherein m is the total number of M residues in said oligomer and is in the range 0 to 75;

wherein n is the total number of N residues in said oligomer, and is in the range 3 to 150;

wherein n is equal to or greater than m and the sum of n and m is in the range from 3 to 150;

wherein X and each Y is independently selected from the group consisting of H, $NH_4$, alkali metals and alkaline earth metals; and wherein each Z is independently selected from the group consisting of H and $CH_3$;

b) greater than 85.5 to 99.95% by weight of one or more monomers selected from the group consisting of esters of acrylic and methacrylic acid with alcohols containing from 1 to 24 carbons, amides of acrylic and methacrylic acid, vinyl esters of carboxylic acids containing from 1 to 20 carbons, vinyl-aromatic compounds containing compounds containing up to 20 carbons, ethylenically unsaturated nitriles containing from 3 to 6 carbons, vinyl halides, and non-aromatic hydrocarbons containing from 2 to 8 carbons and at least one olefinic double bond: and c) 0 or up to 10% by weight of one or more other copolymerisable monomers. Preferably, at least one mode of the multi-modal particle size distribution is attributable to a dispersion of polymer particles having an average particle diameter of from 40 to 150 nm. Preferably, a major portion of polymer particles within said at least one mode having an average particle diameter of from 40 to 150 nm are particles of said copolymer. In one particular embodiment, at least one mode of the multi-modal particle size distribution is attributable to a dispersion of polymer particles having an average particle diameter of from 40 to 100 nm. of which a major portion of polymer particles within said at least one mode are particles of said copolymer.

The aqueous dispersion having a multi-modal particle size distribution may be bimodal, or it may comprise more than two modes. The preparation and use of multi-modal emulsion polymers is well known in the art, for example as disclosed in U.S. Pat. No. 4,539,361 and U.S. Pat. No. 5,624,992.

Aqueous dispersions of the present invention may be prepared with high polymer solids content. For example, an aqueous dispersion of the present invention comprising polymer particles having a multi-modal particle size distribution may comprise 70% or more, e.g. up to 75%, by weight polymer solids. Accordingly, the aqueous dispersions of the present invention preferably comprise from 40 to 75% by weight polymer solids, more preferably 55 to 75% by weight polymer solids.

The aqueous compositions may be used in or as coatings, such as paints, primers and varnishes, binders for nonwovens and textiles, electronic chemicals, powder coatings, dispersants such as pigment dispersants, paper coatings, metal coatings, leather treatments, adhesives, floor polishes, caulks, and elastomeric wall mastics. The dispersions may be used alone or in combination with one or more other polymer dispersions.

Preferably, the aqueous compositions are used in paints to improve their performance properties. For example, the aqueous compositions of the present invention are useful for improving the scrub resistance of a coating, the corrosion resistance of a coating, the opacifying capacity of a coating, and/or the efflorescence resistance of a coating.

The aqueous compositions of the present invention are preferably used in or as architectural coatings such as interior and exterior house paints, including masonry paints, wood coatings and treatments, floor polishes, maintenance coatings such as coatings onto metal substrates, and traffic paints such as those paints used to mark roads, pavements and runways. In a preferred embodiment, the present invention includes a method for coating a substrate, wherein the substrate is a wall, floor or ceiling of a building.

In addition to the copolymer, the aqueous compositions of the present invention may include other optional components. Such other optional components include, without limitation, other polymers, surfactants, extenders, pigments and dyes, pearlescents, adhesion promoters, crosslinkers, dispersants, defoamers, leveling agents, optical brighteners, uv stabilizers, coalescents, rheology modifiers and antioxidants.

In a preferred embodiment, the present invention provides an aqueous composition comprising, dispersed or dissolved therein, I) a copolymer formed by polymerisation, preferably by emulsion polymerisation, of a monomer mixture consisting of:

a) 0.05 to less than 4.5% by weight of one or more terminally unsaturated oligomers of the formula:

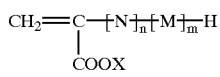

wherein N the residue of an ethyieriically unsaturated monomer of the formula:

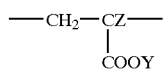

wherein M is the residue of an ethylenically unsaturated monomer other than N;
wherein said N and M residues are randomly arranged in said oligomer;
wherein m is the total number of M residues in said oligomer and is in the range 0 to 75;
wherein n is the total number of N residues in said oligomer and is in the range 3 to 150;
wherein n is equal to or greater than m and the sum of n and m is in the range from 3 to 150:
wherein X and each Y is independently selected from the group consisting of H, $NH_4$, alkali metals and alkaline earth metals; and
wherein each Z is independently selected from the group consisting of H and $CH_3$;

b) greater than 85.5 to 99.5 by weight of at least one monomer selected from the group consisting of esters of acrylic and methacrylic acid with alcohols containing from 1 to 24 carbons, amides of acrylic and methacrylic acid, vinyl esters of carboxylic acids containing from 1 to 20 carbons, vinyl-aromatic compounds containing compounds containing up to 20 carbons, ethylenically unsaturated nitriles containing from 3 to 6 carbons, vinyl halides, and non-aromatic hydrocarbons containing from 2 to 8 carbons and at least one olefinic double bond; and c) 0 or up to 10% by weight of one or more other copolymerisable monomers; and II) an inorganic particulate material. Preferably the inorganic particulate material is selected from the group consisting of pigments, extenders and other inorganic particulate materials used in paints and primer compositions. Examples of such inorganic particulate materials include for example titanium dioxide, clays carbonates, and silicates. The preferred inorganic pigment is titanium dioxide. In this particular embodiment. the ratio of component I) to component II) is preferably in the range 1:10 to 10:1. Such compositions are particularly suitable for use in or as paints, undercoats or primers.

The invention will now be more specifically described in terms of the following examples of some preferred embodiments which are given for the purposes of illustration only, and may be contrasted with the comparative tests also given below.

EXAMPLES

I. Preparation of Oliyomers

Preparation of Oligomer "A"

Oligomer A is a terminally unsaturated oligomer of acrylic acid prepared according to the procedures described in U.S. Pat. No. 5,710,227. Oligomer A was prepared at 29% solids in water, with a weight average molecular weight, Mw, of 1199; and a number average molecular weight, Mn, of 485.

Preparation of Oligomer "B"

Oligomer B is a terminally unsaturated oligomer of acrylic acid prepared according to the procedures described in U.S. Pat. No. 5,710,227. Oligomer B was prepared at 55.3% solids in water, with a weight average molecular weight, Mw, of 1015; and a number average molecular weight, Mn, of 400.

Preparation of Oligomer "C"

Oligomer C is a terminally unsaturated oligomer of acrylic acid prepared according to the procedures described in U.S. Pat. No. 5,710,227. Oligomer B was prepared at 29.2% solids in water, with a weight average molecular weight, Mw. of 1511; and a number average molecular weight, Mn, of 590.

II. Preparation of Emulsion Polymers Nos. 1–5

Preparation of Copolymer No. 1. (2.5% Oligomer A)

A mixture of monomers was prepared by combining 295 g of deionized water, 21.3 g of a 30% aqueous solution of an alkyl polyethoxylated sulfate, 423 g of methyl methacrylate, 428 g of butyl acrylate, and 76.3 g of a 29% aqueous solution of Oligomer A. The monomer mix was emulsified by mixing under standard conditions. 580 g of deionized water and 15 g of alkyl polyethoxylated sulfate were charged to a three liter flask, and the contents heated to 82–84° C. 50 g of the emulsified monomer mixture was charged to flask, followed by 18.4 g of an 18.5% aqueous solution of ammonium persulfate. The monomer mixture and 49 g of a 3.7% aqueous solution of ammonium persulfate were added linearly and separately to the flask over 180 minutes while maintaining the temperature of the contents at 82–84° C. After the additions were completed, the contents of the flask were cooled to60° C. Any remaining monomer was reduced by the addition of aqueous ferrous sulfate, aqueous tertiary butyl hydroperoxide, and isoascorbic acid. The polymer neutralized to a DH of 9.1 with ammonia. The product was diluted with deionized water to provide a polymer solids level of 44.6% by weight. The latex had a particle size of 91 nm and a viscosity of 100 cps.

Preparation of Copolymer No 2 (1.5% "Oligomer A")

Copolymer No. 2 was prepared in an identical manner as Copolymer No. 1. In this case 45.7 g of a 29% aqueous solution of Oligomer A and 315 g of deionized water was added to prepare the mixture of monomers. The polymer neutralized to a pH of 9.7 with ammonia. The product was diluted with deionized water to provide a polymer solids level of 44.2% by weight. The latex had a particle size of 90 nm and a viscosity of 80 cps.

Preparation of Copolymer No. 3. (4.0% "Oligomer A")

Copolymer No. 3 was prepared in an identical manner as Copolymer No. 1. In this case 122 g of a 29% aqueous solution of Oligomer A. 410 g of methyl methacrylate, and 261 g of deionized water was added to prepare the mixture of monomers. The polymer neutralized to a pH of 9.4 with ammonia. The product was diluted with deionized water to provide a polymer solids level of 43.6% by weight. The latex had a particle size of 98 nm and a viscosity of 67 cps.

Preparation of Copolymer No. 4. (1.0% "Oligomer A")

Copolymer No. 4 was prepared in an identical manner as Copolymer No. 1. In this case 30.5 g of a 29% aqueous solution of Oligomer A. 427 g of methyl methacrylate, 437 g of butyl acrylate, and 326 g of deionized water was added to prepare the mixture of monomers. The polymer neutralized to a pH of 9.7 with ammonia. The product was diluted with deionized water to provide a polymer solids level of 43.0% by weight. The latex had a particle size of 90 nm and a viscosity of 43 cps.

Preparation of Copolymer No. 5. (Comparative 2.5% MAA)

This latex polymer was prepared in a conventional manner (see for example, U.S. Pat. No. 5,356,968). A mixture of monomers was prepared by combining 348 g of deionized water, 21.3 g of a 30% aqueous solution of an alkyl polyethoxylated sulfate, 423 g of methyl methacrylate, 428 g of butyl acrylate, and 22 g of methacrylic acid. The monomer mix was emulsified by mixing under standard conditions. 580 g of deionized water and 15 g of alkyl polyethoxylated sulfate were charged to a three liter flask, and the contents heated to 82–84° C. 50 g of the emulsified monomer mixture was charged to flask, followed by 18.4 g of an 18.5% aqueous solution of ammonium persulfate. The monomer mixture and 49 g of a 3.7% aqueous solution of ammonium persulfate were added linearly and separately to the flask over 180 minutes while maintaining the temperature of the contents at 82–84° C. Any remaining monomer was reduced by the addition of aqueous ferrous sulfate, aqueous tertiary butyl hydroperoxide, and isoascorbic acid. The polymer neutralized to a pH of 9.2 with ammonia. The product was diluted with deionized water to provide a polymer solids level of 43.9% by weight. The latex had a particle size of 89 nm and a viscosity of 30 cps.

III. Preparation of Semi-gloss Coatings Compositions Nos. 1–5

For comparative purposes, semi-gloss compositions were prepared according to the following formulations. Tamol 681 is a dispersant available from Rohm and Haas Company. Ti-Pure R-900 is a coatings grade rutile titanium dioxide, available from DuPont de Nemours Co. Foamaster VL is a defoamer, available from Henkel Corp. Texanol is a coalescent, available from Eastman Kodak Co. Triton GR-7M is a surfactant, available from Union Carbide Co. Acrysol 1020 NPR and Acrysol RM-825 are thickeners, both available from Rohm and Haas Company.

The semi-gloss coating compositions were prepared comprising each of the above copolymers. The semi-gloss coating compositions were prepared by Formulation No. 1. For Paint Compositions No. 1–5, the pigment grind for each paint is the same. The letdowns vary by thickener amounts to get a final low-shear viscosity of 90–100 KU. The final paints were 25.2% pigment volume concentration/32.8% volume solids.

Formulation No. 1

| Material | Grams |
|---|---|
| Propylene Glycol | 30.00 |
| Tamol 681 (35%) | 7.67 |
| Foamaster VL | 5.00 |
| Water | 10.00 |
| Ti-Pure R-900 | 134.13 |

Grind the above ingredients for 20 minutes on a high speed disperser. The grind was then let down at a slower speed with the following materials:

| | |
|---|---|
| Copolymer No 1–5 | 264.00 |
| Texanol | 12.20 |
| Foamaster VL | 5.00 |
| Triton GR-7M | 1.00 |
| Acrysol RM-1020 NPR | see Table 1 |
| Acrysol RM-825 | see Table 1 |
| Water | 52.00 |
| Totals: | 525.10 |
| PVC: 25.17 | |
| Vol. Solids: 32.80 | |
| Kg/liters: 1.29 | |
| Wt. Solids: 47.82 | |

TABLE 1

Thickener usage levels in Formulation No 1

| Paint Composition # | 1 | 2 | 3 | 4 | 5 |
|---|---|---|---|---|---|
| g Acrysol RM-2020 NPR | 1.8 | 1.5 | 1.6 | 0.8 | 2.0 |
| g Acrysol RM-825 | 0.8 | 0.8 | 0.9 | 0.9 | 2.1 |
| total Acrysols added | 2.6 | 2.3 | 2.5 | 1.7 | 4.1 |

Each semi-gloss paint composition was then evaluated for paint properties. The results from evaluating properties of each paint made from the corresponding copolymer are shown in Table 2. The test methods are described below.

TABLE 2

Results of tests

| Copolymer No. | 1 | 2 | 3 | 4 | 5 |
|---|---|---|---|---|---|
| % acid | 2.5 | 1.5 | 4.0 | 1.0 | 2.5 |
| Color Acceptance | | | | | |
| DD reflectance | 55.72 | 55.72 | 55.90 | 53.71 | 52.50 |
| BO Reflectance | 56.12 | 55.94 | 55.55 | 53.78 | 54.50 |
| DD-BO | −0.40 | −0.22 | 0.35 | −0.07 | −2.00 |
| Scrub Resistance | | | | | |
| first cut | 749 | 853 | 540 | 1123 | 558 |
| cut through | 1014 | 1151 | 724 | 1312 | 782 |
| Thickener demand | | | | | |
| (see Table 1) | 2.6 | 2.3 | 2.5 | 1.7 | 4.1 |

TABLE 2-continued

Results of tests

| Copolymer No. | 1 | 2 | 3 | 4 | 5 |
|---|---|---|---|---|---|
| Stability | | | | | |
| syneresis | 1.0 mm | none | 1.0 mm | none | 4.0 mm |
| Opacifying Capacity | | | | | |
| Scattering Coefficient | 8.09 | 8.78 | 7.49 | not measured | 6.79 |

IV. Test Methods

1. Color Acceptance.

The paints for this series were tinted with 113.4g/3.78541 (4oz/gallon) of phthalo blue colorant. A film was drawn down with $7.5 \times 10^{-3}$ cm (3 mil) Bird applicator on a white chart. The draw downs (DD) were allowed to dry overnight in a controlled temperature room (25° C./50% relative humidity). Paint was applied over a 7.5 cm×7.5 cm (3 inch×3 inch) section of the dried paint film with a 2.5 cm (1 inch) nylon brush. The paint was brushed out (BO) over the surface with a dry brush until the paint applied has a brush drag as indicated by the film becoming tacky. The applied film is allowed to, dry overnight under the same conditions above, Y reflectance was measured with a Hunter Lab Ultra Scan XE spectrophotometer over the draw down (DD) and brushed out (BO) areas of the film. The difference in Y reflectance between the draw down and brushed out areas was calculated. Optimum color acceptance is realized when the difference between the draw down and brushed out areas is zero. The closer the value is to zero. the better the color acceptance.

From Table 2 it can be seen that the paints made from copolymers 1–4 had significantly better color acceptance. These paints were made from binders stabilized with the oligomer. The paints made from copolymers 4 had extraordinarily fine color acceptance. This copolymer had the lowest level of oligomer.

2. Scrub Resistance.

Scrub resistance was measured with Gardner Laboratory Inc. Strainline Washability/Abrasion Machine. Paints were draw down on black vinyl panels Type P-121-1ON, (Leneta Co.)with a $17.5 \times 10^{-3}$ cm (7 mil) Dow film applicator. The draw downs are allowed to dry for 7 days in a controlled temperature room (25° C./50% relative humidity). The draw downs were scrubbed with the Abrasion Machine. The nylon brush was soaked in water for 24 hours prior to the test. A $25 \times 10^{-3}$ cm (10 mil) shim was used. 10 g of Abrasive scrub medium Type SC-2 (Leneta Co.) was applied to the brush at the beginning of the test and after 400 cycles. Five milliliters of water was added to the brush after 400 cycles. For each draw down the number of scrubbing cycles required to first cut the film exposing the vinyl substrate, and subsequently cut through the film a continuous line the width of the shim was recorded. Films that require more scrub cycles to cut through the film were most resistance to scrubbing.

The results in Table 2 show the scrub resistance increases as the level of oligomer in the copolymer decreases. At equal levels of acid, paints made from copolymer no. 1 vs copolymer no. 5, the scrub resistance of the paint made from copolymer no. 1 (stabilized with the oligomer) was 30% more than the control. The paint made from copolymer no. 4 had scrub resistance 68% higher than the comparative paint from copolymer no. 5, and 30% higher than paint made from copolymer no. 1

3. Thickener Demand.

The amount of thickener required to formulate each paint to a common desired viscosity was recorded. It is a cost advantage to use the minimum amount of thickener to achieve desired viscosity.

As shown in Table 2. less thickener was required for the copolymers with lower levels of oligomer. At equal levels of acid, copolymer no. 1 vs copolymer no. 5, the copolymer made with oligomer A was significantly more efficient in thickening than the control. That advantage was greater still at the lower level of oligomer.

4. Stability—Syneresis.

After the phthalo blue colorant was added to the paints, the paints were held at room temperature for 24 hours. After this time, the paints were evaluated visually for evidence of syneresis. Any syneresis was measured in mm. As shown in Table 2 all the copolymers with oligomer A had less syneresis than the comparative paint made from copolymer no. 5. Tinted paints made from the copolymers with the lowest level of oligomer had no syneresis.

5. Scattering Coefficient.

On clean glass plates, 25 cm×30 cm×0.625 cm (10"×12"× 0.25"), 4 films were drawn down for each sample. Triplicate draw downs with $3.75 \times 10^{-3}$ cm (1.5 mil) Bird applicator and a single 0.1 cm (40 mil) draw down were made. The draw downs were allowed to dry for 7 days in a controlled temperature room (25° C./50% relative humidity). The dried films were scored with a 6.25 cm×15 cm (2.5"×6") template using an excel knife. Five reflectance values were measured in the scored areas with a portable Gardner Reflectometer. The scored area was removed from the plate, placed in a tares weighing pan, and dried at 120° C. overnight. The weight of this dried film was obtained. The scattering coefficient was calculated from the Kubelka-Munk equation. The higher the coefficient the greater the opacity of the film. The results in Table 2 show the scattering coefficient increases as the level of oligomer in the copolymer decreases. The greater scattering coefficient demonstrates a greater hiding in dry films. From Table 2. it can be seen that semi-gloss coatings employing copolymer 1–4 demonstrate a superior balance of properties over semi-gloss coatings formed from conventional MAA (Copolymer No. 5) based compositions, particularly with regard to scrub resistance and color acceptance. Similarly, by extrapolation, it can be derived that coatings formed from compositions wherein the oligomer content in the copolymer is 4.5% or more will not have the same superior balance of properties exhibited by the coatings formed by the method of the present invention.

V. Preparation of Emulsion Polymers Nos. 6–9

Preparation of Copolymer No. 6. (Comparative 1.3% MAA)

A mixture of monomers was prepared by combining 575 g of deionized water, 7.1 g of sodium lauryl sulfate (28% active), 1061 g of methyl methacrylate, 912 g of butyl acrylate, and 26.2 g of methacrylic acid. The monomer mix was emulsified by mixing under standard conditions, 970 g of deionized of deionized water were charged to a five liter flask, and the contents heated to 87° C. 60.7 g of sodium lauryl sulfate (28%T active), 100.8 g of the emulsified monomer mixture, 7.8 g of sodium persulfate, and 110 g of deionized water were added to flask. The monomer mixture was added linearly to the flask over 90 minutes while maintaining the temperature of the contents at 80–82° C. When the additions were complete, 37 g of deionized water was added, and the flask cooled. The remaining monomer was reduced by the addition of aqueous ferrous sulfate heptahydrate, tertiary butyl hydroperoxide, and sodium formaldehyde sulfoxylate. After the reaction mixture was cooled to room temperature, the polymer neutralized to a pH of 9.4 with ammonia. The product isolated had a solids level of 48.9% by weight. The latex had a particle size of 95 nm.

Preparation of Copolymer No. 7. (Comparative 1.1% AA)

A mixture of monomers was prepared by combining 575 g of deionized water, 24.6 g of sodium lauryl sulfate (28% active), 1066 g of methyl methacrylate, 912 g of butyl acrylate, and 22 g of acrylic acid. The monomer mix was emulsified by mixing under standard conditions. 970 g of deionized of deionized water were charged to a five liter flask, and the contents heated to 87° C. 4.0 g of sodium lauryl sulfate (28% active), 100.8 g of the emulsified monomer mixture, 7.8 g of sodium persulfate, and 110 g of deionized water were added to flask. The monomer mixture was added linearly to the flask over 90 minutes while maintaining the temperature of the contents at 80–82° C. During the reaction, 260 g of deionized water was added to the flask. When the additions were complete, 37 g of deionized water was added, and the flask cooled. The remaining monomer was reduced by the addition of aqueous ferrous sulfate heptahydrate, tertiary butyl hydroperoxide, and sodium formaldehyde sulfoxylate. After the reaction mixture was cooled to room temperature, the polymer neutralized to a pH of 9.4 with ammonia. The product isolated had a solids level of 51.8% by weight. The latex had a particle size of 150 nm.

Preparation of Copolymer No. 8. (1.1% Oligomer B)

A mixture of monomers was prepared by combining 570 g of deionized water, 23.6 g of sodium lauryl sulfate (28% active), 1024 g of methyl methacrylate. 876 g of butyl acrylate, and 21 g of a 55.3% aqueous solution of Oligomer B. The monomer mix was emulsified by mixing under standard conditions. 970 g of deionized of deionized water were charged to a five liter flask, and the contents heated to 87° C. 4.0 g of sodium lauryl sulfate (28% active), 22.5 g of deionized water, 0.96 g of sodium lauryl sulfate (28% active), 35.7 g of butyl acrylate, 41.7 g of methyl methacrylate, 1.0 g of acrylic acid, 7.8 g of sodium persulfate, and 110 g of deionized water were added to flask. The monomer mixture was added linearly to the flask over 90 minutes while maintaining the temperature of the contents at 80–82° C. During the reaction, 260 g of deionized water was added to the flask. When the additions were complete, 37 g of deionized water was added, and the flask cooled. The remaining monomer was reduced by the addition of aqueous ferrous sulfate heptahydrate, tertiary butyl hydroperoxide, and sodium formaldehyde sulfoxylate. After the reaction mixture was cooled to room temperature, the polymer neutralized to a pH of 9.4 with ammonia. The product isolated had a solids level of 48.7% by weight. The latex had a particle size of 154 nm.

Preparation of Copolymer No. 9. (Comparative 0.74% AA)

A mixture of monomers was prepared by combining 575 g of deionized water, 24.6 g of sodium lauryl sulfate (28% active), 1075 g of methyl methacrylate, 911 g of butyl acrylate, and 14.8 g of acrylic acid. The monomer mix was emulsified by mixing under standard conditions. 970 g of deionized of deionized water were charged to a five liter flask, and the contents heated to 87° C. 4.0 g of sodium lauryl sulfate (28% active), 102 g of the emulsified monomer mixture, 7.8 g of sodium persulfate, and 110 g of deionized water were added to flask. The monomer mixture was added linearly to the flask over 90 minutes while maintaining the temperature of the contents at 80–82° C. During the reaction, 260 g of deionized water was added to the flask. When the additions were complete, 36 g of deionized water was added, and the flask cooled. The remaining monomer was reduced by the addition of aqueous ferrous sulfate heptahydrate, tertiary butyl hydroperoxide, and sodium formaldehyde sulfoxvlate. After the reaction mixture was cooled to room temperature, the polymer neutralized to a pH of 9.4 with ammonia. The product isolated had a solids level of 49.2% by weight. The latex had a particle size of 154 nm.

VI. Preparation of Paint Compositions Nos. 6–9

Copolymers No. 6 to 9 were formulated into paint compositions using Formulation No. 2. For Paint Compositions No. 6–9, the pigment grind for each paint is the same. The let-downs varied by binder, thickener and water amounts. Thickener level is varied to get a final low-shear viscosity of 90–95 KU. The water amount varies so that the final paint is 52% pigment volume concentration/34% volume solids. Tamol 850 is a dispersant, available from Rohm and Haas. Triton CF-10 is a surfactant, available from Union Carbide Co. Colloid 643 is a defoamer, available from Rhone Poulenc. Ti-Pure R-902 is a rutile titanium dioxide, available from Dupont de Nemours Co. Minex 4 is a silicate extender, available from Unimin Co. Eagle Zinc 417W is zinc oxide, available from Eagle Zinc Co. Natrosol 250 MR is solid grade hydroxy ethyl cellulose, available from Aqualon Co. Ropaque OP-96 is an emulsion polymer, available from Rohm and Haas Co. Texanol is a coalescent, available from Eastman Chemical Co. Acrysol SCT-275 is a thickener, available from Rohm and Haas Co

| Formulation No. 2: | |
|---|---|
| | grams |
| Water | 150.0 |
| Propylene Glycol | 45.0 |
| Tamol 850 (30%) | 10.4 |
| Potassium tripolyphosphate (100%) | 2.04 |
| Triton CF-10 | 1.0 |
| Colloid 643 | 2.0 |
| Ti-Pure R-902 | 200.0 |
| Minex 4 | 150.0 |
| Eagle Zinc 417W | 25.0 |
| Natrosol 250 MR (100%) | 30 |
| Water | 60.0 |

Grind above ingredients on high-speed disperser for 20 minutes

| | |
|---|---|
| Binder | (see Table 3) |
| Ropaque OP-96 | 70.87 |
| Texanol | 17.72 |
| Colloid 643 | 2.0 |
| Acrysol SCT-275 | (see Table 3) |
| Water | (see Table 3) |

TABLE 3

Binder/Thickener/Water levels used in Formulation No 2

| Paint Composition # | 6 | 7 | 8 | 9 |
|---|---|---|---|---|
| g binder | 314.03 | 317.3 | 319.56 | 315.10 |
| g Associative Thickener | 5.56 | 3.2 | 3.3 | 2.7 |
| g water | 58.74 | 60.81 | 58.58 | 63.41 |

We tested the efflorescence resistance of Paint Composition Nos. 6 to 9. The results are shown in Table 4. Paint Composition No. 8, made from Copolymer 8 and stabilized with oligomer B, provided improved efflorescence resistance over Paint Composition Nos. 6, 7, and 9.

TABLE 4

Results of efflorescence tests

| | | Tombstone Test | | | |
|---|---|---|---|---|---|
| | Stabilization | 3-Day dry | | 7-day dry | |
| Paint Composition No. | % acid charged in Copolymer | one coat | two coats | one coat | two coats |
| 6 | 1.3 MAA | 2 | 5 | 4 | 5 |
| 7 | 1.1 AA | 2 | 9 | 5 | 8 |
| 8 | 1.1 Oligomer B | 9 | 10 | 10 | 10 |
| 9 | 0.738 AA | 7 | 10 | 8 | 9 |

VII. Tombstone Test for Efflorescence

A modification of the "Union Carbide Tombstone Test" was used to evaluate the efflorescence resistance of the test paints. In our testing, 15 cm×15 cm (6"×6")unglazed ceramic tile (American Olean Tile, Lansdale, Pa.) is coated with test paint tinted with phthalo blue so that the white deposits show up readily. The bottom 2.5 cm (1") of the tiles is left uncoated, the back of the tile has just one coat of paint, and the sides and front of the tile have two coats of paint.

After either three days or seven days drying, the tiles are set in a rack so that only the bottom, uncoated portion of the tile is submersed in a 2% aqueous solution of sodium sulfate. The salt solution wicks up the tile to simulate efflorescence. The tiles are left in the solution for 24 hours, then removed and allowed to dry. Tiles are rated on a scale of 1 to 10, with 10 being the best efflorescence resistance. While the results are semiquantitative, and will vary from operator to operator based on differing judgments of the severity of efflorescence, we found that for a given operator test results for the same coating run multiple times do not vary by more than +/−1 unit.

The results show the Paint Composition No. 8, made with oligomer B, had superior efflorescence. Note that Paint Composition No. 9 with a lower level of AA (Copolymer 9) did improve efflorescence resistance relative to Paint Composition Nos. 6 and 7, but not to the same extent as Paint Composition No. 8. Therefore it is not just the lower acid incorporation in the polymer particles that is giving the excellent efflorescence resistance. There is an effect unique to the oligomer B.

VIII. Preparation of Copolymers No. 10–17

To a five liter stirred reactor containing 1180.8 g of deionized water and 18.2 g of Rhodapex CO-436 (Rhodia Corp, Cranberry N.J.), which had been heated to 81° C. was added 114.8 g of monomer emulsion or composition as described Table 5. A solution of 3.3 g of ammonium persulfate in 29 g of deionized water and a solution of 0.4 g of aqueous ammonia (29%) in 19 g of deionized water was then added. Eight minutes after the first addition the remainder of the monomer emulsion or composition and a solution of 2 g of ammonium persulfate in 220.2 g of deionized water were added linearly and separately to the flask over 180 minutes while maintaining the temperature. of the contents at 80–82° C. The monomer emulsion was rinsed into the reactor with 40 g of deionized water. A catalyst/activator pair was added after the monomer emulsion feed was completed. The polymer was neutralized with aqueous ammonia. The product was then diluted with deionized water to adjust the final solids of the latex. The latex solids, particle size, and viscosity are shown in Table 5

TABLE 5

Composition of Copolymers 10 to 17

| Example | 10 | 11 | 12 | 13 | 14 | 15 | 16 | 17 |
|---|---|---|---|---|---|---|---|---|
| Monomer Emulsion | | | | | | | | |
| DI water | 550 | 550 | 550 | 550 | 466 | 424.1 | 382.1 | 340.1 |
| Rhodapex CO-436 | 7.2 | 7.2 | 7.2 | 7.2 | 7.2 | 7.2 | 7.2 | 7.2 |
| 2-Ethyl hexyl acrylate | 637.1 | 645.7 | 654.4 | 661.3 | 626.7 | 630.2 | 631.9 | 635.4 |
| Methyl Methacrylate | 1059.5 | 1033.5 | 1007.6 | 983.3 | 1069.9 | 1049.1 | 1030.1 | 1009.3 |
| Methacrylic acid | 34.6 | 51.9 | 69.2 | 86.6 | — | — | — | — |
| Oligomer C | — | — | — | 132.2 | 198.2 | 264.3 | 330.4 | |
| Post Polymerization | | | | | | | | |
| Dilution Water | 165 | 165 | 165 | 165 | 0 | 0 | 0 | 0 |
| Polymer Properties | | | | | | | | |
| % Solids | 42.5 | 41.7 | 41.9 | 42 | 43.1 | 43.0 | 42.9 | 43.0 |
| Particle Size | 113 | 101 | 96 | 98 | 99 | 98 | 101 | 97 |
| pH | 8.8 | 8.1 | 8.0 | 7.7 | 5.2 | 4.8 | 44 | 4.4 |

Copolymers No. 10 through 17 were formulated into paint compositions as shown in Table 6. A pigment grind was prepared for each paint on a high speed disk disperser. The pigment grind is shown as the firsts set of components in Table 6. The grind were then let down with the second set of components in Table 6. The final paints were 18 PVC, 34% volume solids. Tamol 681 is a dispersant, available from Rohm and Haas. Triton CF-10 is a surfactant, available from Union Carbide Co. Drew L-493 is a defoamer. available from Ashland Chemical Co. Dowanol DPM is a coalescent, trademark Dow Chemical Co. Ti-Pure R-900 is a rutile titanium dioxide, available from DuPont de Nemours Co. Texanol is a coalescent, available from Eastman Chemical Co. Acrysol RM-SW is a thickener, available from 5 Rohm and Haas Co.

TABLE 6

Paint Formulation Containing Copolymers 10 to 17

| | Paint Composition # | | | | | | | |
|---|---|---|---|---|---|---|---|---|
| Ingredients | 10 | 11 | 12 | 13 | 14 | 15 | 16 | 17 |
| Water | 15.00 | 15.00 | 15.00 | 15.00 | 15.00 | 15.00 | 15.00 | 15.00 |
| Propylene Glycol | 30.00 | 30.00 | 30.00 | 30.00 | 30.00 | 30.00 | 30.00 | 30.00 |
| Dowanol DPM | 15.00 | 15.00 | 15.00 | 15.00 | 15.00 | 15.00 | 15.00 | 15.00 |
| Tamol 681 (35%) | 8.80 | 8.80 | 8.80 | 8.80 | 8.80 | 8.80 | 8.80 | 8.80 |
| Triton CF-10 | 2.20 | 2.20 | 2.20 | 2.20 | 2.20 | 2.20 | 2.20 | 2.20 |
| Drew L-493 | 1.00 | 1.00 | 1.00 | 1.00 | 1.00 | 1.00 | 1.00 | 1.00 |
| Ammonium Hydroxide (28%) | 1.00 | 1.00 | 1.00 | 1.00 | 1.00 | 1.00 | 1.00 | 1.00 |
| Ti-Pure R-900 | 205.50 | 205.50 | 205.50 | 205.50 | 205.50 | 205.50 | 205.50 | 205.50 |
| Copolymer No. 10 | 621.30 | — | — | — | — | — | — | — |
| Copolymer No. 11 | — | 632.00 | — | — | — | — | — | — |
| Copolymer No. 12 | — | — | 630.00 | — | — | — | — | — |
| Copolymer No. 13 | — | — | — | 623.00 | — | — | — | — |
| Copolymer No. 14 | — | — | — | — | 614.30 | — | — | — |
| Copolymer No. 15 | — | — | — | — | — | 618.60 | — | — |
| Copolymer No. 16 | — | — | — | — | — | — | 618.90 | — |
| Copolymer No. 17 | — | — | — | — | — | — | — | 620.00 |
| Water | 10.00 | 10.00 | 10.00 | 10.00 | 10.00 | 10.00 | 10.00 | 10.00 |
| Ammonium Hydroxide (14%) | 10.00 | 5.00 | 5.00 | 8.30 | 10.60 | 18.20 | 17.40 | 24.40 |
| Texanol | 39.60 | 39.50 | 39.60 | 39.60 | 39.70 | 39.90 | 39.80 | 40.00 |
| Water | 43.00 | 37.50 | 39.80 | 45.00 | 50.80 | 39.50 | 40.20 | 32.30 |
| Sodium Nitrite (15%) | 9.00 | 9.00 | 9.00 | 9.00 | 9.00 | 9.00 | 9.00 | 9.00 |
| Acrysol RM-8W (17.5%) | 4.60 | 4.20 | 4.20 | 1.70 | 3.80 | 3.90 | 3.40 | 3.80 |
| Total Weight | 1016.00 | 1015.70 | 1016.10 | 1015.10 | 1016.70 | 1017.60 | 1017.20 | 1018.00 |
| % Weight Solids | 47.0 | 47.0 | 47.0 | 47.0 | 47.1 | 47.2 | 47.1 | 47.2 |
| % Volume Solids | 34.2 | 34.2 | 34.2 | 34.2 | 34.2 | 34.2 | 34.2 | 34.2 |
| Pigment Volume Concentration, % | 18.0 | 18.0 | 18.0 | 18.0 | 18.0 | 18.0 | 18.0 | 18.0 |

IX. Corrosion Resistance, Salt Spray Test

Corrosion resistance was tested by exposure of panels to a salt spray environment (5% sodium chloride fog). Panels were prepared by drawing down the paints on 10 cm×30 cm (4"×12") sandblasted hot-rolled steel panels and drying for two weeks at 23.89° C. (75° F.)/50% relative humidity to yield a final dry film thickness of $5 \times 10^{-3}$ cm (2 mil). Exposed metal was covered with tape (3M plastic tape #471) prior to exposure. A scribe mark is usually scratched into the bottom half of the panel immediately before exposure. Panels are removed periodically to rate rust and blistering.

The data in Table 7 shows the Oligomer stabilized latexes give significantly reduced rust and fewer blisters on the steel panels. The coatings 14 to 17, comprising the copolymers 14 to 17, demonstrate a superior balance of properties over conventional MA based compositions 10 to 13, particularly with regard to corrosion resistance (rust and blister resistance). By extrapolation, it can be derived that coatings formed from compositions wherein the oligomer content is 4.5% or more will not have the same superior balance of properties exhibited by the coatings wherein the oligomer content is less than 4.5%.

TABLE 7

| | Corrosion Resistance, salt spray tests, results | | | | | | | |
|---|---|---|---|---|---|---|---|---|
| Example | 10 | 11 | 12 | 13 | 14 | 15 | 16 | 17 |
| Acid | 2 MAA | 3 MAA | 4 MAA | 5 MAA | 2 OligomerC | 3 OligomerC | 4 OligomerC | 5 OligomerC |
| Salt Spray (2 week CTR dry) | | | | | | | | |
| 7 days unscribed | | | | | | | | |
| blister | 9 D | 9 D | 7 D | 6–8 D | 10 | 7–9 VF | 10 | 8 vF |
| rust | 25% | 40% | 30% | 5% | 1% | 5% | 1% | 1% |
| scribed | | | | | | | | |
| blister | 8 D | 8 D | 6–8 D | 6–8 D | 8 vF | 7–9 D | 6–9 vF | 4–9 M |
| rust | 50% | 60% | 15% | 25% | 5% | 10% | 10% | 20% |
| 14 days unscribed | | | | | | | | |
| blister | 8 D | 8 D | 7 D | 6–8 D | 9 vF | 6–8 F | 9 M/D | 8–9 D |
| rust | 70% | 75% | 50% | 50% | 5% | 5% | 10% | 20% |

TABLE 7-continued

Corrosion Resistance, salt spray tests, results

| Example | 10 | 11 | 12 | 13 | 14 | 15 | 16 | 17 |
|---|---|---|---|---|---|---|---|---|
| scribed | | | | | | | | |
| blister | 8 D | 8 D | 6–8 D | 6–8 D | 7 F | 6–9 F | 5–8 M | 4–8 M/D |
| rust | 85% | 75% | 50% | 60% | 10% | 10% | 20% | 30% |

X. Preparation of High Solids Compositions
Preparation of a High Solids Bimodal Emulsion Polymer with "Oligomer A"

A mixture of monomers was prepared by combining 300 g of deionized water, 33.6 g of sodium dodecylbenzene sulfonate (23% in water), 995.9 g of methyl methacrylate, 1548 g of butyl acrylate, and 124.5 g of a 29% aqueous solution of Oligomer A. The monomer mix was emulsified by mixing under standard conditions, 800 g of deionized water was charged to a five liter flask, and the contents heated to 85° C. 40.9 g of a 45% solids, 100 nm seed latex was added to the reaction flask along with 10.32 g of ammonium persulfate dissolved in 19 g of deionized water. The monomer mixture was added to the reaction flask over 120 minutes while maintaining the temperature of the contents at about 85° C. After 45% of the monomer mixture was added to the reaction flask, 62.5 g of a 41.5% solids, 80 nm seed latex was added to the reaction flask. Any remaining monomer was reduced by the addition of aqueous ferrous sulfate, aqueous tertiary butyl hydroperoxide, and sodium sulfoxylate formaldehyde. The polymer was neutralized to a pH of about 7.0 with ammonia. The reaction mixture was then cooled to room temperature. The resulting latex had a solids content of 63%, a viscosity of 160 cps and two modes indicating one mode having an average particle size of 120 nm and the other mode having an average particle size of 240 nm.

Comparative Example
Preparation of a High Solids Bimodal Emulsion Polymer with Acrylic Acid An emulsion polymer prepared as above with an equal weight of acrylic acid substituted for "Oligomer A" produced a 63% solids latex with a viscosity of 270 cps and two modes indicating one mode having an average particle size of 119 nm and the other mode having an average particle size of 230 nm.

Preparation of a High Solids Multimodal Emulsion Polymer with "Oligomer A"

A mixture of monomers was prepared by combining 201 g of deionized water, 29.5 g of sodium dodecylbenzene sulfonate (23% in water), 874.2 g of methyl methacrylate, 1358.8 g of butyl acrylate, and 109.3 g of a 29% aqueous solution of Oligomer A. The monomer mix was emulsified by mixing under standard conditions, 459 g of deionized water was charged to a five liter flask, and the contents heated to 85° C. 19.3 g of a 45% solids, 100 nm seed latex was added to the reaction flask along with 4.81 g of ammonium persulfate dissolved in 17 g of deionized water. The monomer mixture was added to the reaction flask over 120 minutes while maintaining the temperature of the contents at about 85° C. After 25% of the monomer mixture was added to the reaction flask, a solution of 1.92 g of ammonium persulfate in 50 g of deionized water was added over a 120 minute period. After 45% of the monomer mixture was added to the reaction flask, 35.1 g of a 41.5% solids, 80 nm seed latex was added to the reaction flask. After 75% of the monomer mixture was added to the reaction flask, 98.5 g of sodium dodecylbenzene sulfonate (23% in water) was added to the reaction flask followed by 17.5 g of deionized water. After the additions were completed, the contents of the flask were held at 85° C. for an additional hour. The reaction mixture was then cooled to room temperature. The resulting viscous latex had a solids content of 70%.

We claim:
1. An aqueous composition comprising, dispersed or dissolved therein, a copolymer formed by polymerisation of a monomer mixture consisting of:
 a) 0.05 to less than 4.5% by weight of one or more terminally unsaturated oligomers of the formula:

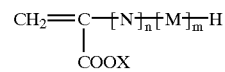

wherein N is the residue of an ethylenically unsaturated monomer of the formula:

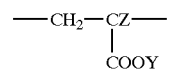

wherein M is the residue of an ethylenically unsaturated monomer other than N;
 wherein said N and M residues are randomly arranged in said oligomer;
 wherein m is the total number of M residues in said oligomer and is in the range 0 to 75;
 wherein n is the total number of N residues in said oligomer and is in the range 3 to 150;
 wherein n is equal to or greater than m and the sum of n and m is in the range from 3 to 150;
 wherein X and each Y is independently selected from the group consisting of H, $NH_4$, alkali metals and alkaline earth metals; and
 wherein each Z is independently selected from the group consisting of H and $CH_3$;
 b) greater than 85.5 to 99.95% by weight of at least one monomers selected from the group consisting of esters of acrylic and methacrylic acid with alcohols containing from 1 to 24 carbons, amides of acrylic and methacrylic acid, vinyl esters of carboxylic acids containing from 1 to 20 carbons, vinyl-aromatic compounds containing compounds containing up to 20 carbons, ethylenically unsaturated nitriles containing from 3 to 6 carbons, vinyl halides, and non-aromatic hydrocarbons containing from 2 to 8 carbons and at least one olefinic double bond; and
 c) 0 or up to 10% by weight of one or more other copolymerisable monomers.

2. An aqueous composition as claimed in claim 2, wherein X, Y and Z are each H.

3. An aqueous composition as claimed in claim 1, wherein M is a residue of one or more ethylenically unsaturated monomers selected from the group consisting of methylacrylate, ethyl acrylate, butyl acrylate, ethylhexyl acrylate, styrene, isoprene, butadiene, vinyl acetate, acrylamide, acrylonitrile, allylmethacrylate, methyl methacrylate, ethyl methacrylate and butyl methacrylate.

4. An aqueous compostion as claimed in claim 1, wherein monomers b) are selected from the group consisting of methyl(meth)acrylate, ethyl(meth)acrylate, butyl(meth)acrylate, 2-ethylhexyl(meth)acrylate, decyl(meth)acrylate, lauryl(meth)acrylate, isobornyl(meth)acrylate, isodecyl(meth)acrylate, oleyl(meth)acrylate, palmityl(meth)acrylate, steryl(meth)acrylate, styrene, butadiene, vinyl acetate, vinyl chloride, vinylidene chloride, acrylonitrile, methacrylonitrile, acrylamide and glycidylmethacrylate.

5. An aqueous composition as claimed in claim 1, wherein monomers c) are selected from the group consisting of hydroxyethyl(meth)acrylate, hydroxypropyl(meth)acrylate, acrylic acid, methacrylic acid, crotonic acid, fumaric acid, maleic acid, mono-methyl itaconate, mono-methyl fumarate, monobutyl fumarate, maleic anhydride, phosphoethyl methacrylate, glycidyl (meth)acrylates, substituted acrylamides, diacetone acrylamide, glycidyl (meth)acrylates, glycidyl methacrylate, acetoacetoxy ethyl methacrylate, acrolein, methacrolein, dicyclopentadienyl methacrylate, dimethyl meta-isopropenyl benzyl isocyanate, isocyanato ethyl methacrylate, methyl cellulose, hydroxyethyl cellulose, ethylene, propylene, N-vinyl pyrrolidone, N,N'-dimethylamino(meth)acrylate, and polymerizable surfactants.

6. An aqueous composition as claimed in claim 1, wherein said copolymer has a weight average molecular weight above 1,000,000, as measured by gel permeation chromatography.

7. An aqueous composition as claimed in claim 1, wherein said copolymer has a glass transition temperature (Tg) in the range of from −25 to 120 °C. as measured by Differential Scanning Calorimetry.

8. An aqueous composition as claimed in claim 1, wherein the monomer mixture which is polymerized to form said copolymer preferably comprises from 0.5%o to 4% by weight of terminally unsaturated oligomer a).

9. An aqueous composition as claimed in claim 1, wherein said copolymer is in the form of a latex dispersion wherein the particles of the latex dispersion have an average diameter no greater than 250 nm.

10. An aqueous composition as claimed in claim 1, wherein said composition additionally comprises inorganic particulate material.

11. An aqueous composition as claimed in claim 1, wherein said composition is in the form of an aqueous dispersion of polymer particles having a multimodal particle size distribution, wherein at least one mode of said multimodal particle size distribution is attributable to a dispersion of polymer particles comprising a copolymer formed by the emulsion polymerisation of a monomer mixture comprising:

a) 0.05 to less than 4.5% by weight of one or more terminally unsaturated oligomers of the formula:

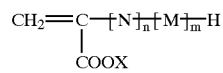

wherein N is the residue of an ethylenically unsaturated monomer of the formula:

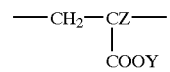

wherein M is the residue of an ethylenically unsaturated monomer other than N;

wherein said N and M residues are randomly arranged in said oligomer;

wherein m is the total number of M residues in said oligomer and is in the range 0 to 75;

wherein n is the total number of N residues in said oligomer and is in the range 3 to 150;

wherein n is equal to or greater than m and the sum of n and mn is in the range from 3 to 150;

wherein X and each Y is independently selected from the group consisting of H, $NH_4$, alkali metals and alkaline earth metals; and wherein each Z is independently selected from the group consisting of H and $CH_3$;

b) greater than 85.5 to 99.95% by weight of one or more monomers selected from the group consisting of esters of acrylic and methacrylic acid with alcohols containing from 1 to 24 carbons, amides of acrylic and methacrylic acid, vinyl esters of carboxylic acids containing from 1 to 20 carbons, vinyl-aromatic compounds containing compounds containing up to 20 carbons, ethylenically unsaturated nitriles containing from 3 to 6 carbons, vinyl halides, and non-aromatic hydrocarbons containing from 2 to 8 carbons and at least one olefinic double bond; and c) 0 or up to 10% by weight of one or more other copolymerisable monomers.

12. An aqueous composition as claimed in claim 11 comprising from 40 to 75% by weight polymer solids.

13. An aqueous composition as claimed in claim 11, wherein at least one mode of the multi-modal particle size distribution is attributable to a dispersion of polymer particles having an average particle diameter of from 40 to 100 nm.

14. An aqueous composition as claimed in claim 13, wherein a major portion of polymer particles within said at least one mode having an average particle diameter of from 40 to 100 nm are particles of said copolymer.

15. A method of improving the performance of a coating, wherein the method comprises I) applying to a substrate an aqueous coating composition and II) drying the aqueous coating composition to form said coating, characterised in that said aqueous coating composition comprises an aqueous composition as claimed in claim 1.

* * * * *